S. B. SHANK'S
Combinend Cultivator & Corn-Worker.
118159
PATENTED AUG 15 1871
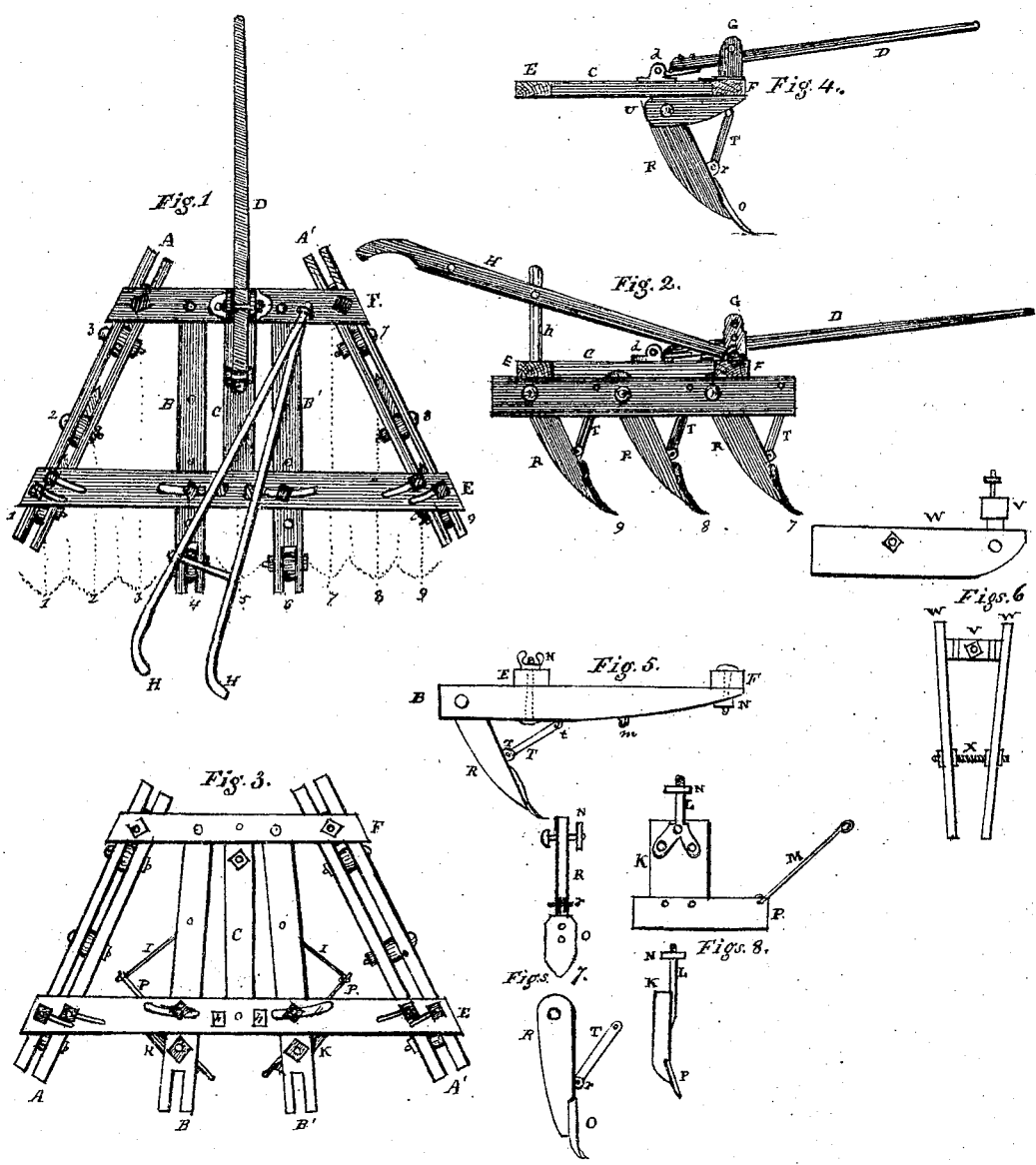
Witnesses.
Inventor.
Samuel B. Shank

UNITED STATES PATENT OFFICE.

SAMUEL B. SHANK, OF MILLERSVILLE, PENNSYLVANIA.

IMPROVEMENT IN CULTIVATORS.

Specification forming part of Letters Patent No. 118,159, dated August 15, 1871.

*To all whom it may concern:*

Be it known that I, SAMUEL B. SHANK, of Millersville, in the county of Lancaster and State of Pennsylvania, have invented certain Improvements in the Arrangement of a Combined Cultivator and Corn-Worker, of which the following is a specification:

The nature of my invention consists in the arrangement of the hinged shovel-supports, by pivot-bolts, between double and slotted beams, and manner of constructing the parts, so that with a slight change, easily made, three distinct operations can be performed in a superior manner in working the soil, plowing, and dressing the corn when up.

The drawing and letters of reference show the different parts combined and in detail.

Figure 1 shows a top view of the cultivator with the nine shovels in place, making nine furrows equidistant apart for working the soil; Fig. 2, a side elevation of the same; Fig. 3, the front shovel and two central hind shovels, 4, 5, and 6, removed, and the scrapers, Fig. 8, inserted on the central beams B B', for working the corn and soil between the furrows to the center on each side of the row of standing corn. Fig. 4 shows the attachment of the front central shovel 5 on c. Fig. 5 shows one of the center shovels 4 6 on the slotted beams B B'. Fig. 6 shows the protecting-boards or sled to be put in the same place occupied by the front central shovel 5, to protect the young corn from being buried or pressed to one side of the soil thrown in by the scrapers or side shovels; Fig. 7, the shovels and appliances; Fig. 8, the scrapers, shown in both cases in front and profile.

A brief explanation of the drawing will enable any one skilled in the art to make and use the same.

The two double side beams A A' are, as also the slotted center beams B B', on pivot-bolts, secured beneath the front cross-piece F, and made adjustable in the rear cross-piece E, as shown by the curved slots, headed bolts and nuts, thumb-screws, or their equivalents, E N, Fig. 5. The center piece C is rigidly fixed to the cross-pieces E F, and supports the hinged tongue or pole D, adjustable in its draft between the standard G. The handles H and their supporting-posts h comprise the frame-work. The central or front shovel 5 is on a short, slotted, detachable head-block U; the central rear shovels 4 6 in the slotted ends of the beams B B'. The supports R of the side shovels 1 2 3 and 7 8 9 are held in headed pivot-bolts and screw-nuts N, between the double beams A A', as are the other supports of shovels 4, 5, and 6, in the slotted ends aforesaid. These hinged supports R are braced by rods or bars T, secured to their respective beams, except those two on the beams B B', which are attached to a hook, t, on their under side. These bars T are attached by a wooden pin, r, to the supports R above the shovels O, so as to prevent breaking or otherwise injuring the shovels, as is the case on striking a root, rock, or the like, when rigidly fixed, as heretofore; this combined arrangement forms a superior cultivator. To work the corn when yet quite small—so difficult to do with the cultivators in use—it is only necessary to raise the hinge-pole D and detach the front central shovel with its head U, and replace it with the protecting-boards W, Fig. 6, which is substantially the same for which Letters Patent No. 85,968, January 19, 1869, were granted to me, and therefore I do not claim in this case; but find it to give greater satisfaction, combined with the shovel arrangement as herein shown. To work the corn later, when it has attained sufficient growth, to remove the grass between the furrows, the protecting-boards may be dispensed with, and the two central rear shovels 4 6 removed also, and replaced by the scrapers or grass-plows, shown in detail by Fig. 8, and mode of application by Fig. 3, in which case the side shovels 1 2 3 and 7 8 9 loosen the soil, both in advance of the scrapers and center between the furrows. The rods M on the scrapers P are attached to the hook m on the under side of the beams B B'; the supporting-block R, with its screw-rod L; this latter is inserted into a hole made for its reception in the beams B B', between the slot and cross-piece E, and secured by a nut or thumb-screw, N. Each change is readily made, and is of superior efficacy.

I am aware of the numerous arrangements already patented, with similar objects in view to improve the implements for cultivating purposes. As a practical farmer I felt that improvements were yet desirable to adjust the shovels and protect them from injury to which they are constantly subjected, and by a simple change to adapt the same implement to the various uses required on the farm. Each feature, separately considered, may not be new; but the arrangement of double and slotted shovel-beams in which the shovel-heads are held on pivot-bolts and braced and held by wooden pins I believe to be as novel on cultivators as it is useful, as are the general shifting arrangement and simplicity of the parts.

What I claim as my invention, and desire to secure by Letters Patent, is—

The cultivating devices K and P, shown in Fig. 3, in combination with the frame, consisting of the outer side pieces A A and inner beams B B, all pivoted to the front bar F, and made obliquely adjustable by means of the curved slots in the bar E, and fitted to receive either set of cultivating devices, as shown.

SAMUEL B. SHANK.

Witnesses:
 JNO. M. AMWEG,
 JACOB STAUFFER.